US005436057A

United States Patent [19]

Schulz

[11] Patent Number: 5,436,057

[45] Date of Patent: Jul. 25, 1995

[54] HIGH SOFTNESS EMBOSSED TISSUE WITH NESTING PREVENTION EMBOSSED PATTERN

[75] Inventor: Galyn A. Schulz, Appleton, Wis.

[73] Assignee: James River Corporation, Richmond, Va.

[21] Appl. No.: 999,414

[22] Filed: Dec. 24, 1992

[51] Int. Cl.[6] ........................ D04H 1/64; B32B 31/20

[52] U.S. Cl. .................................... 428/156; 428/338; 428/220; 428/215; 428/213; 428/152; 428/153; 428/154; 428/162; 428/163; 428/165; 428/167; 428/171; 428/172; 428/174; 428/179; 428/175; 428/181; 428/187; 428/537.5; 428/906; 162/117; 162/118; D5/39; D5/37; D5/53; D5/58

[58] Field of Search ............... 428/338, 220, 215, 213, 428/152, 153, 154, 156, 162, 163, 165, 167, 171, 172, 174, 179, 175, 181, 187, 537.5, 906; 162/117, 118; D5/39, 37, 53, 58

[56] References Cited

U.S. PATENT DOCUMENTS

| | | | |
|---|---|---|---|
| D. 40,254 | 9/1909 | Zschaemisch | D5/99 |
| D. 63,343 | 11/1923 | Vandergaw et al. | D5/57 |
| D. 64,690 | 5/1924 | Schwarz | D5/37 |
| D. 77,398 | 1/1929 | De Lancy | D5/59 |
| D. 117,018 | 10/1939 | Turpan | D5/37 |
| D. 154,696 | 8/1949 | Mitschke | D5/37 |
| D. 167,528 | 8/1952 | Odzer | D5/37 |
| D. 179,699 | 2/1957 | Sadinoff | D5/39 |
| D. 184,493 | 2/1959 | Scheiding | D5/57 |
| D. 184,878 | 4/1959 | Korkovius | D5/53 |
| D. 213,661 | 3/1969 | Hicks | D5/59 |
| D. 231,019 | 3/1974 | Gilling et al. | D5/59 |
| D. 231,021 | 3/1974 | Gilling et al. | D5/53 |
| D. 239,137 | 3/1976 | Appleman | D5/53 |
| D. 288,150 | 2/1987 | Schulz et al. | D5/53 |
| D. 298,588 | 11/1988 | Peddada | D5/57 |
| D. 319,349 | 8/1991 | Schultz et al. | D5/53 |
| D. 496,964 | 5/1893 | Wheeler | D5/53 |
| D. 497,421 | 5/1893 | Wheeler | D5/57 |
| 2,121,013 | 6/1938 | Brown | 428/181 |
| 2,954,838 | 10/1960 | Nuorivaara | 116/156 |
| 3,240,656 | 3/1966 | Faircloth | 428/175 |
| 4,307,141 | 12/1981 | Walbrun | 428/178 |
| 4,320,162 | 3/1982 | Schulz | 428/154 |
| 4,339,088 | 7/1982 | Niedermeyer | 242/1 |
| 4,483,728 | 11/1984 | Bauernfeind | 428/172 |
| 4,659,608 | 4/1987 | Schulz | 428/906 |
| 4,759,967 | 7/1988 | Bauernfeind | 428/154 |
| 4,803,032 | 2/1989 | Schulz | 162/117 |
| 4,927,588 | 5/1990 | Schulz | 162/117 |

*Primary Examiner*—William Watkins, III
*Attorney, Agent, or Firm*—Finnegan, Henderson, Farabow, Garrett & Dunner

[57] ABSTRACT

This invention relates to the discovery that the perceived softness of embossed tissue can be increased greatly while avoiding prior art nesting problems if a particular pattern is embossed into the tissue. This pattern combines relatively shallow stitchlike debossments with deeper more sharply defined signature debossments. The stitchlike debossments are rounded and arranged in wavy flowing intersecting lines. The signature debossments are arranged in regions framed by the intersecting wavy flowing lines.

35 Claims, 11 Drawing Sheets

HIGH SOFTNESS EMBOSSED TISSUE WITH NESTING PREVENTION EMBOSSED PATTERN

BACKGROUND

1. Field of the Invention

The invention relates to an embossed tissue exhibiting a high perceived softness. The invention further relates to a roll of embossed tissue. The embossed tissue of the invention results in superior overall appearance of the product as well as a consumer perception of improved softness. The embossed tissue of the present invention also results in a more uniformly rolled tissue.

2. Background of the Invention

Tissue produced using conventional wet press technology must usually be embossed subsequent to creping to improve bulk, appearance and perceived softness. It is known in the art to emboss sheets comprising multiple plies of creped tissue to increase the surface area of the sheets thereby enhancing their bulk and water holding capacity. Toilet tissue is usually marketed in rolls, containing a specified number of sheets per roll. Tissue embossed in conventional patterns of spot embossments, when packaged in roll form, exhibit a tendency to be non-uniform in appearance often due to uneven buildup of the debosses as the sheet is wound onto the roll, resulting in a ridging effect detracting from the appearance of the rolls.

Prior art embossing patterns have been set forth which emboss products in a manner selected to avoid nesting of the bosses in rolled, folded or stacked sheets of paper product by various means. For one example of such a pattern, see U.S. Pat. No. 4,659,608.

The present invention provides an embossed tissue which avoids buildup and ridging problems while heightening the consumers perception of softness. In the present invention, the embossing pattern combines relatively shallow stitchlike debossments with deeper more sharply defined signature debossments. The overall arrangement of the pattern is selected so that, even though the sheet is embossed heavily in the signature debossments, the signature debossments fully overlap at a maximum of two locations in the roll, the outermost of these being at least about an eighth of an inch inward frown the exterior surface of the roll. Moreover, the overall average emboss density is substantially uniform for each machine direction strip in the roll. The combined effect of this arrangement is that the rolls possess very good roll structure and do not exhibit the ridging effect found with prior art emboss patterns.

This invention further relates to the discovery that the perceived softness of embossed tissue can be increased greatly if a particular pattern is embossed into the tissue. This pattern combines relatively shallow stitchlike debossments with deeper more sharply defined debossments. The shallow, stitchlike debosses are positioned to give a "puffy" quilted appearance creating the both actual shading and the illusion of shading as would be seen in a quilt having chambers filled with fiber or down. This appearance results from the use of stitchlike rounded debossments arranged in wavy flowing intersecting lines both to simulate the appearance of stitches of a quilt as well as to distort the actual shape of the quilt so that the shape and appearance cooperate to reinforce the "quiltlike" appearance. The waviness of the lines simulates the appearance of stitching displaced from straight lines by the filling in the quilt while creating the appearance of shading resulting from a three dimensional shape. In addition, the wavy flowing lines of debossments actually distort the sheet producing a shape resembling the surface of a filled quilt.

Signature debossments in regions framed by the intersecting wavy flowing lines serve to greatly enhance the bulk of the tissue while also enhancing the distortion of the surface. The signature debossments are elongate and continuous rather than stitchlike, and are embossed to significantly greater depth and have more sharply defined boundaries than the debossments defining the wavy flowing lines. In addition, the signature debossments further enhance the puffy or filled appearance of the sheet both by creating the illusion of shading as well as by creating actual shading due to displacement of the sheet apparently caused by puckering of surrounding regions caused by the heavy emboss given to the signature.

SUMMARY OF THE INVENTION

The objects and advantages of the invention wile be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in according with the purpose of the invention, as embodied and broadly described herein, there is disclosed:

A sheet of tissue having a plurality of debossments formed therein defining a lattice pattern having a plurality of polygonal cells, a fraction, less than all, of said polygonal cells being filled with a signature debossment, said lattice pattern being defined by a sinuous gracile array of stitchlike debossments undulating about the generators of said lattice pattern, said stitchlike debossments being encompassed by upwardly flaring regions; said signature being comprised of a plurality of elongated debossments having a depth of deboss exceeding the depth of deboss of said stitchlike debossments, said elongate debossments being encompassed by upwardly flaring regions encompassing said stitchlike debossments being more steeply inclined than the upwardly flaring regions encompassing said stitchlike debossments.

There is further disclosed, a sheet of tissue having a plurality of debossments formed therein defining a lattice pattern having a plurality of polygonal cells, a fraction, more than one-third but less than two-thirds, of said polygonal cells being filled with a signature debossment, said lattice pattern being defined by a sinuous gracile array of stitchlike debossments undulating about the generators of said lattice pattern, said stitchlike debossments being encompassed by rotund arcuate regions having cross-sectional radii of curvature exceeding at least about 0.010 inch; said signature being comprised of a plurality of elongated debossments having a depth of deboss exceeding the depth of deboss of said stitchlike debossments by at least 0.005 inch, said elongate debossments being encompassed by arcuate regions having cross-sectional radii of curvature of the arcuate regions encompassing said stitchlike debossments.

There is further disclosed:

A roll of embossed tissue having a plurality of debossments formed therein, said debossments comprising:

two series of intersecting sinuous lines of stitchlike debossments, one series of lines being disposed at a first acute angle clockwise of the machine direction of the roll, the other series of lines being disposed at a second acute angle counterclockwise of the machine direction of the roll whereby a repeating pattern comprising an oblique lattice of substantially uniform staggered wavy diamonds is defined;

a plurality of signature debosses centrally located within alternating rows of said diamond, the disposition of said debossments being configured such that substantial nesting of said signature debossments on said rolls occurs at a maximum of two locations on said roll, the outermost of said locations being spaced at least 0.10 inch below the exterior surface of said roll and, the innermost, at least 0.5 inch inward from said outermost substantial nesting location.

There is still further disclosed:

A roll of embossed tissue having a plurality of debossments formed therein, said debossments comprising:

two equally spaced series of intersecting sinuous lines of stitchlike debossments, one series of lines being disposed at a first acute angle clockwise of the machine direction of the roll, the other series of lines being disposed at a second acute angle counterclockwise of the machine direction of the roll whereby an oblique lattice of substantially uniform staggered wavy diamonds is defined;

a plurality of signature debosses centrally located within alternating rows of said diamond, the disposition of said debossments being configured such that, adjacent to the surface of said roll, signature debossments on closely adjacent overlapping repeats are displaced from each other by at least 0.5 inch in the machine direction.

Additional objects and advantages of the invention will be set forth in part in the description which follows, and in part will be obvious from the description, or may be learned by practice of the invention. The objects and advantages of the invention will be realized and attained by means of the elements and combination particularly pointed out in the appended claims.

The accompanying drawings, which are incorporated in and constitute a part of the specification, illustrate various aspects of the invention and, together with the description, serve to explain the principles of the invention.

DESCRIPTION OF THE PREFERRED EMBODIMENTS

Figure 1:
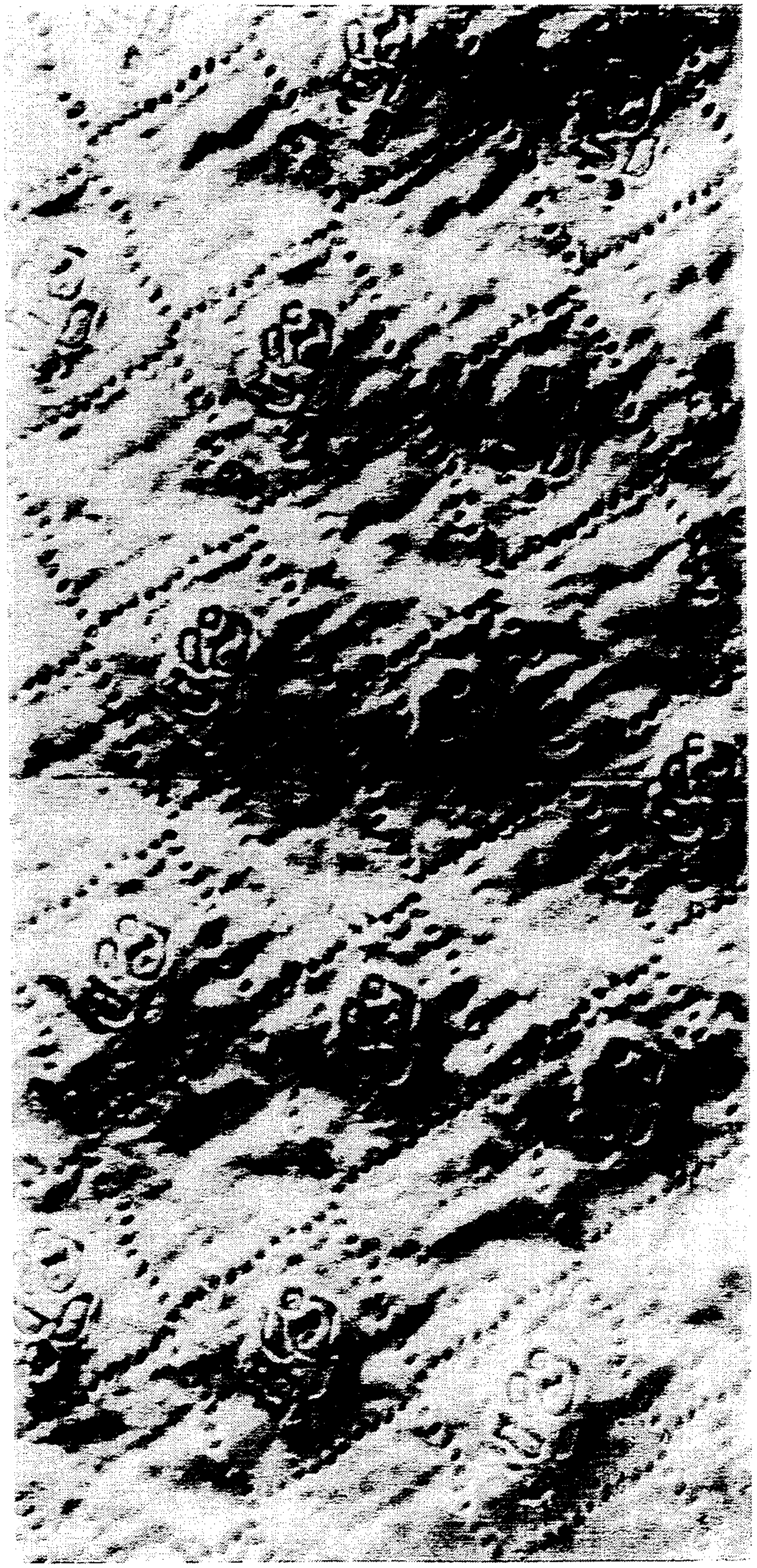
FIG. 1 is a life size photograph of several sheets of the present invention illustrating the startling three dimensional quilted appearance of tissue of the present invention.

According to the present invention, a greatly enhanced perceived softness is provided by a tissue substrate having embossed therein a pattern which is comprised of two distinct elements, the first, an array of stitchlike debossments and the second, a signature debossment. The stitchlike debossment comprises rounded discontinuous structures that are embossed in the tissue substrate in a pattern having a horn-like upwardly flare in a pattern of rounded lines. The effect is a pattern, e.g. diamond shapes, having discontinuous curved, "wavy" lines. Superimposed over this pattern is a signature debossment which appears inside the overlapping pattern of the stitchlike debossment. Thus, the signature debossment, e.g., tulips, are located within the stitchlike debossment pattern, e.g., inside the diamonds.

Substrates for use in the present invention include toilet tissue. The paper substrates for forming the tissue are readily recognizable to the skilled artisan.

In one preferred embodiment of this invention, debossments are formed defining a lattice pattern having a plurality of polygonal cells, a fraction, less than all, preferably more than $\frac{1}{3}$ but less than $\frac{2}{3}$, of the polygonal cells being filled with a signature debossment, said lattice pattern being defined by a sinuous gracile array of stitchlike debossments undulating about the generators of the lattice pattern, the stitchlike debossments being encompassed by rotund, horn-like upwardly flaring, arcuate regions having cross-sectional radius of curvature exceeding at least about 0.015 inch, more preferably at least about 0.025 inch and most preferably at least about 0.050 inch; the signature being comprised of a plurality of elongate debossments having a depth of deboss exceeding the depth of deboss of the stitchlike debossments by at least 0.003 inch, more preferably at least 0.005 inch and most preferably 0.007 inch, the elongate debossments being encompassed by horn-like upwardly flaring, arcuate regions having cross-sectional radii of curvature of not more than 50% of the average radius of curvature of the arcuate regions encompassing the stitchlike debossments, more preferably not more that 25% and most preferably not more than 15%. The cells created by the pattern of stitchlike debossment frame the signature debossment.

In accordance with one embodiment of the present invention, the stitchlike debossment should have an area of less than 10%, preferably 8%, more preferably 6%. The signature debossment should have an area of less than 5%, preferably less than 4%, more preferably less than 3%, the total percent area of debossments being less than about 20%, preferably less than about 15%, more preferably less than about 10%.

According to one embodiment of the present invention, adjacent each side of each cell containing signature debossment are cells which do not contain signature debossment. Further, the width of the tissue sheet is approximately 3 cells wide. The length of the side walls of the cells is about 1.5 inches, more preferably 1.25 inches and most preferably 1.125 inches. The center of the farthest stitchlike debossment is at least 1 diameter but no more than 3 diameters from the line generating the polygonal cell. The array of stitchlike debossments coincides with generators at least 2 times between apices.

In one embodiment of the present invention, the stitchlike debossments are dashes. The dashes have an aspect ratio of less than 5, more preferably between 3 and 5.

The lattice can define cells of varying shape. Shapes which can be used in the present invention include diamond shaped cells, hexagonal cells or octagonal cells. Other cell shapes are readily recognizable to the skilled artisan. In a most preferred embodiment, the cells are diamond shaped.

In another preferred embodiment, a roll of embossed tissue having a smooth exterior surface is provided by arranging the two classes of debossments formed in the tissue as follows: the first class of debossments comprises two series of intersecting sinuous lines of stitchlike debossments, one series of lines being disposed at a first acute angle clockwise of the machine direction of the roll between 15° and 30° the other series of lines being disposed at a second acute angle counterclockwise of the machine direction of the roll between 45° and 65° thereby forming as a repeating pattern an oblique lattice of substantially uniform staggered wavy diamonds. Alternate cross direction cells in these rolls are filled with signature debosses centrally located. The disposition of the debossments is such that substantial nesting of the signature embosses on the rolls occurs at a maximum of two locations on the roll, the outermost of the locations being spaced at least 1/32 inch below the exterior surface of the roll, more preferably at least 1/16 inch below and most preferably at least 0.100 inch below, and, the innermost, at least 0.5 inch inward from the outermost substantial nesting location, more preferably at least 0.75 inch and most preferably at least 0.825 inch.

In still another preferred embodiment, between the outermost nesting location and the innermost nesting location, in at least 40% of the volume of said roll the signature debossments do not overlap each other, more preferably at least 45% and most preferably at least 50%.

In a further embodiment is provided, a roll of embossed tissue having a plurality of debossments formed therein, the debossments having two equally spaced series of intersecting sinuous lines of stitchlike debossments, one series of lines being disposed at a first acute angle clockwise of the machine direction of the roll, the other series of lines being disposed at a second acute angle counterclockwise of the machine direction of the roll whereby an oblique lattice of substantially uniform staggered wavy diamonds is defined. The tissue further having a plurality of signature debosses centrally located with in alternating rows of the diamond, the disposition of the debossments being configured such that, adjacent to the surface of the roll, signature debossments on closely adjacent overlapping repeats are displaced from each other by at least 0.5 inch, more preferably by at least 0.75 inch and most preferably 1.0 inch.

In FIG. 1, several sheet of embossed tissue are illustrated. The pattern includes signature debossments in the shape of tulips which are included within a crisscross pattern of wavy lines which define cells having a diamond shape. As can be seen from FIG. 1, the wavy lines are formed from stitchlike or dotlike embossing.

Figure 2:
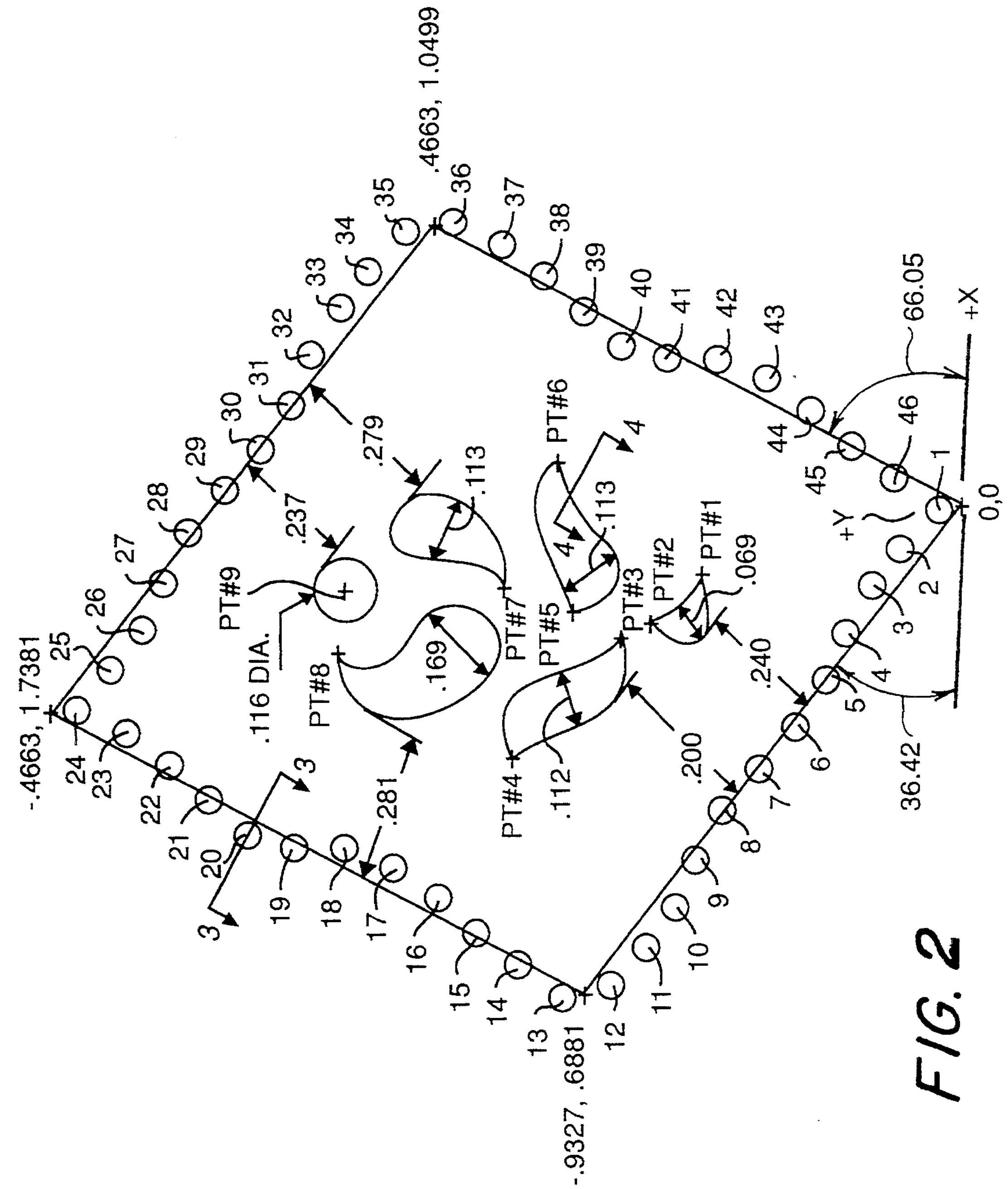
FIG. 2 is a plan view of the emboss pattern of the cells which are filled with signature embosses illustrating the precise location of each of the stitchlike emboss regions yielding the quilted puffy appearance.

FIG. 2 illustrates the actual pattern for formation of the embossing depicted in FIG. 1. Views "3" and "4" set forth in FIG. 2 correspond to FIGS. 3 and 4, respectively. In FIG. 2, the numbered circles 1–46 define the stitchlike debossment which forms the cells, as shown herein having a diamond pattern. As can be seen the debossments are carried inside, across and external the solid lines or generators forming the diamond shape. This indicates the rounded or wavy shape that the lines take.

The dots 1–46 correspond to the rectangular coordinates as set forth in Table 1 below:

TABLE 1

| DOT # | RECTANGULAR COORDINATES |
|---|---|
| 1 | −.0124,.0464 |
| 2 | −.0880,.1136 |
| 3 | −.1569,.1667 |
| 4 | −.2469,.2179 |
| 5 | −.3373,.2528 |
| 6 | −.4248,.3063 |
| 7 | −.5004,.3735 |
| 8 | −.5853,.4410 |
| 9 | −.6801,.4877 |
| 10 | −.7681,.5225 |
| 11 | −.8463,.5781 |
| 12 | −.9202,.6418 |
| 13 | −.9451,.7345 |
| 14 | −.8892,.8231 |
| 15 | −.8332,.9069 |
| 16 | −.7701,.9860 |
| 17 | −.7165,.1.0722 |
| 18 | −.6868,1.1699 |
| 19 | −.6904,1.2649 |
| 20 | −.6701,1.3554 |
| 21 | −.6093,1.4321 |
| 22 | −.5485,1.5113 |
| 23 | −.4925,1.5951 |
| 24 | −.4539,1.6917 |
| 25 | −.3800,1.6281 |
| 26 | −.3018,1.5724 |
| 27 | −.2138,1.5376 |
| 28 | −.1190,1.4910 |
| 29 | −.0341,1.4235 |
| 30 | .0415,1.3562 |
| 31 | .1291,1.3027 |
| 32 | .2195,1.2678 |
| 33 | .3094,1.2166 |
| 34 | .3783,1.1636 |
| 35 | .4539,1.0963 |
| 36 | .4788,1.0036 |
| 37 | .4402,.9070 |
| 38 | .3842,.8232 |
| 39 | .3234,.7440 |
| 40 | .2626,.6673 |
| 41 | .2423,.5768 |
| 42 | .2459,.4818 |
| 43 | .2162,.3841 |

TABLE 1-continued

| DOT # | RECTANGULAR COORDINATES |
|---|---|
| 44 | .1626,.2979 |
| 45 | .0995,.2187 |
| 46 | .0435,.1349 |

Rectangular coordinates for points 1-9, which define the tulip pattern, are set forth in Table 2, below:

TABLE 2

| PT # | RECTANGULAR COORDINATES |
|---|---|
| 1 | −.1709,.4963 |
| 2 | −.2463,.5976 |
| 3 | −.2771,.6501 |
| 4 | −.4982,.8486 |
| 5 | −.2304,.7340 |
| 6 | .0467,.7845 |
| 7 | −.1884,.8766 |
| 8 | −.3286,1.1910 |
| 9 | −.2135,1.1849 |

As seen in FIG. 2, the signature debossment is a plurality of closed segments. Internal dimensions for the signature debossment and relative distances between the two types of debossments are given in FIG. 2.

The signature debossment is separated from the stitchlike debossment by at least 3 dot diameter, more preferably 4, most preferably 5. The dot diameter is at least one and one half times the signature line width, more preferably at least twice the signature line width, and most preferably at least three times the signature line width.

The total stitchlike debossment area in FIG. 2 is 0.0022 sq. inches and corresponds to 3.7% of the surface area of the pattern.

The total signature debossment area in FIG. 2 is 0.0683 sq. inches and corresponds to 2.6% of the surface area of the pattern.

The total surface area of the sketch is 5.2007 sq. inches and the total surface area of pattern per sketch area is 6.3%.

The internal angles of polygonal cells are about 77° and about 103°.

Figure 3:
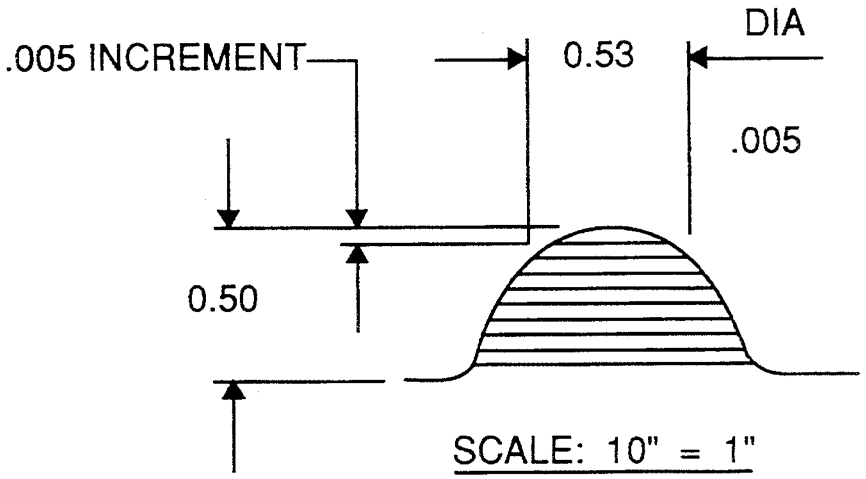
FIG. 3 is a cross-sectional view of a boss used for forming the softly rounded stitchlike debossments.

FIG. 3 illustrates a cross sectional view of the stitchlike debossments which form the cellular pattern. The diameter of the debossment has been measured from the apex, in 0.005 inch increments to the depth of the debossment of 0.050 inches. The dot diameters are set forth in Table 3 below.

TABLE 3

| DPTH | SECTIONED DOT DIAMETER |
|---|---|
| .005 | .040 |
| .010 | .055 |
| .015 | .065 |
| .020 | .072 |
| .025 | .078 |
| .030 | .082 |
| .035 | .087 |
| .040 | .092 |
| .045 | .096 |

Figure 4:
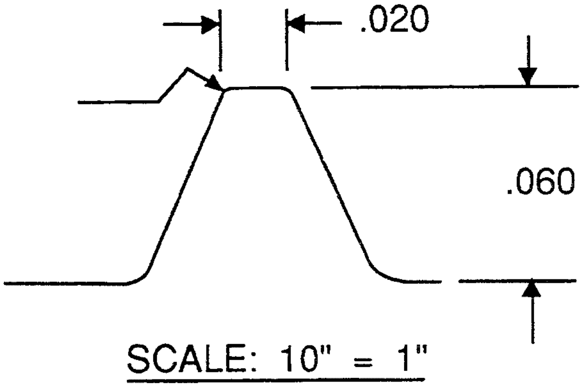
FIG. 4 is a cross-sectional view of a boss used for forming the signature debossments.

FIG. 4 illustrates a cross sectional view of the signature debossment pattern which is found internal the diamond pattern in FIG. 2. As can be seen from FIG. 4, the depth of debossment is about 0.060 inches with an apex diameter of 0.020 inches.

Figure 5:
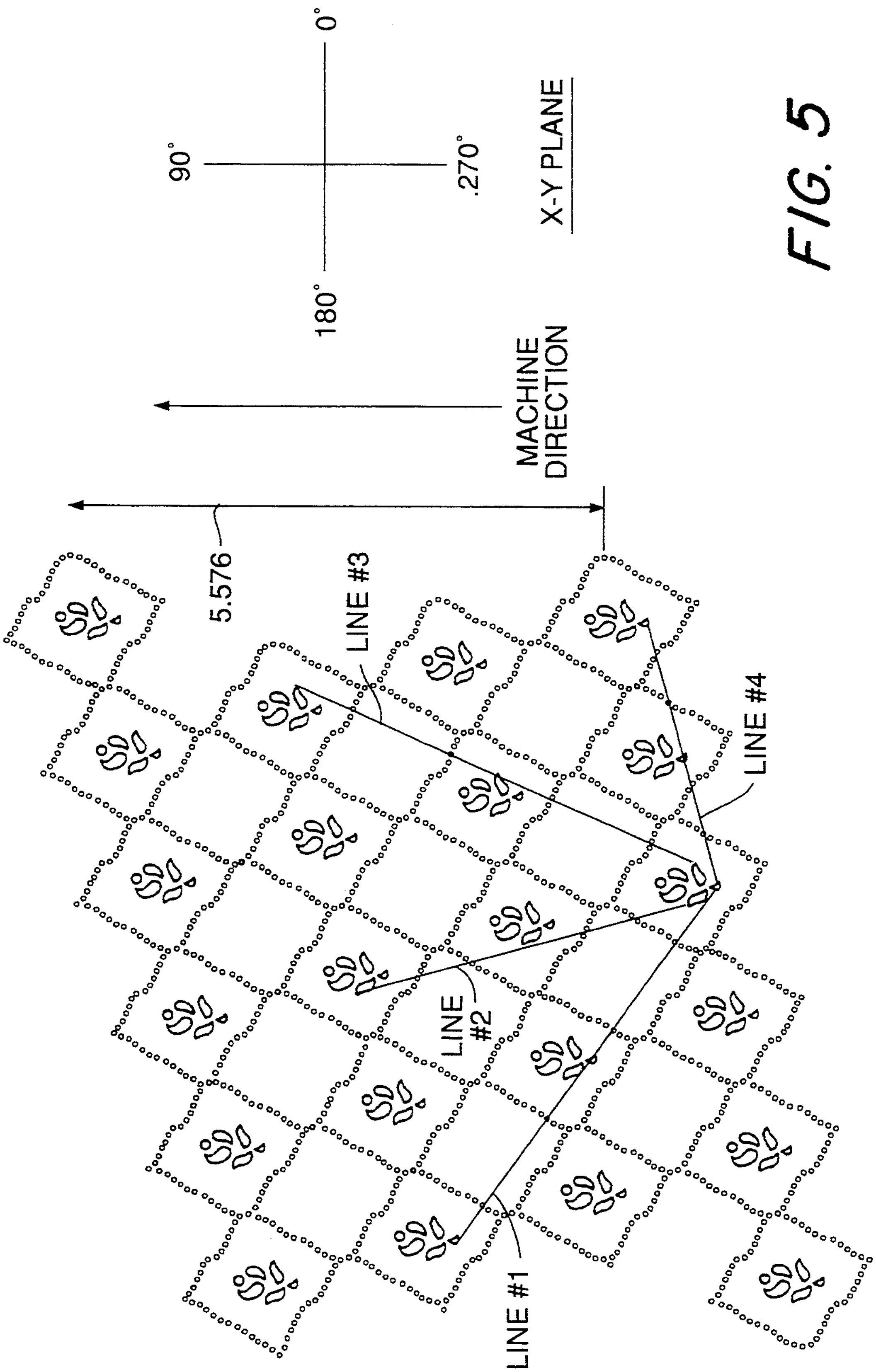
FIG. 5 is a layout illustrating layout of the lattices and signature in relation to the machine direction of the roll.

FIG. 5 illustrates the pattern configuration relative to the machine direction of the roll. The measured angle of the lines relative to the machine direction are set forth in Table 4, below:

TABLE 4

| LINE NO. | ANGLE IN X-Y PLANE |
|---|---|
| #1 | 143.6° |
| #2 | 105.0° |
| #3 | 66.0° |
| #4 | 14.5° |

Line 1 and line 3 indicate not only the angle of the tulip pattern, as do lines 2 and 4, but also indicate the angle of the generators which define the sinuous crisscross pattern.

The angle of line 1, relative to the machine direction, is preferably between 45° and 65°, more preferably 54°.

The angle of line 2, relative to the machine direction, is adjusted accordingly in the preferred embodiment it is 15°.

The angle of line 3, relative to the machine direction, is preferably between 15° and 30°, more preferably 24°.

The angle of line 4, relative to the machine direction is adjusted accordingly, in the preferred embodiment, it is 75.5°.

Figure 6:
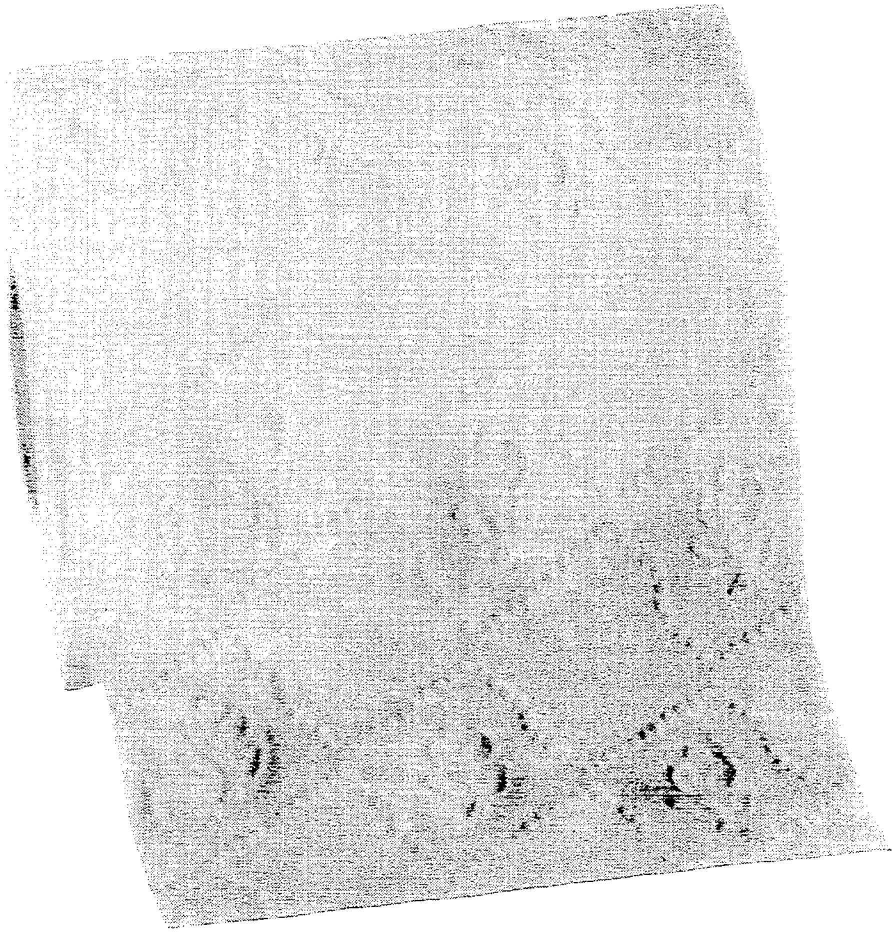
FIG. 6 is a life size photograph illustrating the flat roll structure resulting from the use of the pattern of the present invention alleviates "ridging" observed with prior art patterns.

FIG. 6 is a photograph illustrating one pattern of the present invention on a roll structure.

Figure 7:
FIG. 7 is a life size photograph of a free sheet showing the sinuous or "wavy" shape of the sheet.

FIG. 7 is a photograph of a tissue product embossed with one pattern described herein. FIG. 7 shows the wavy appearance stitchlike and signature debossments and the effect of this embossing on the tissue substrate.

Figure 8:
FIG. 8 is an enlargement of FIG. 1 clearly illustrating the contrast between the shallow softly rounded stitchlike debosses and the deeper more sharply defined signature debosses.

FIG. 8 is an enlargement of FIG. 1 to clarify the distinct embossing elements. It is clear from FIG. 8 that the signature regions and the stitchlike regions differ, thereby rendering a quiltlike appearance to the tissue.

Figure 9B:
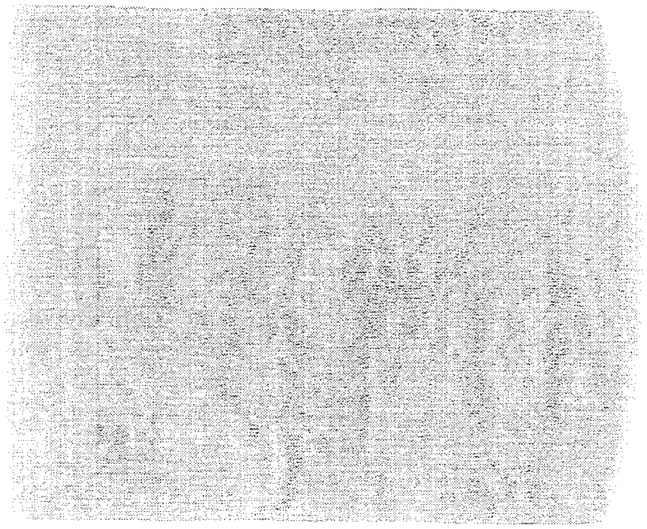
FIG. 9B is an enlarged photograph illustrating the structure of a roll of embossed tissue of the present invention.
Figure 9A:
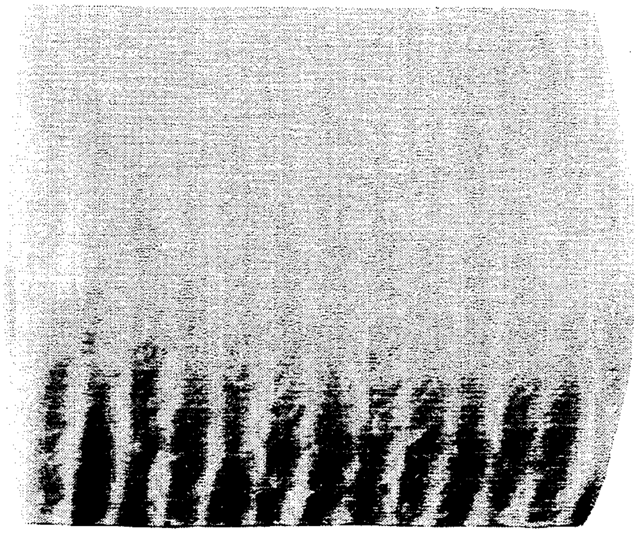
FIG. 9A is an enlarged photograph illustrating the structure of a prior art roll of embossed tissue.

FIG. 9A is a photograph of a roll of the prior art embossed tissue. FIG. 9B is a photograph of a roll of embossed tissue according to the present invention. These photographs illustrate the difference between the structure of the rolls of the present invention and the prior art rolls of embossed tissue, and allow observation of the decreased ridging in the product of the present invention.

Figure 10:
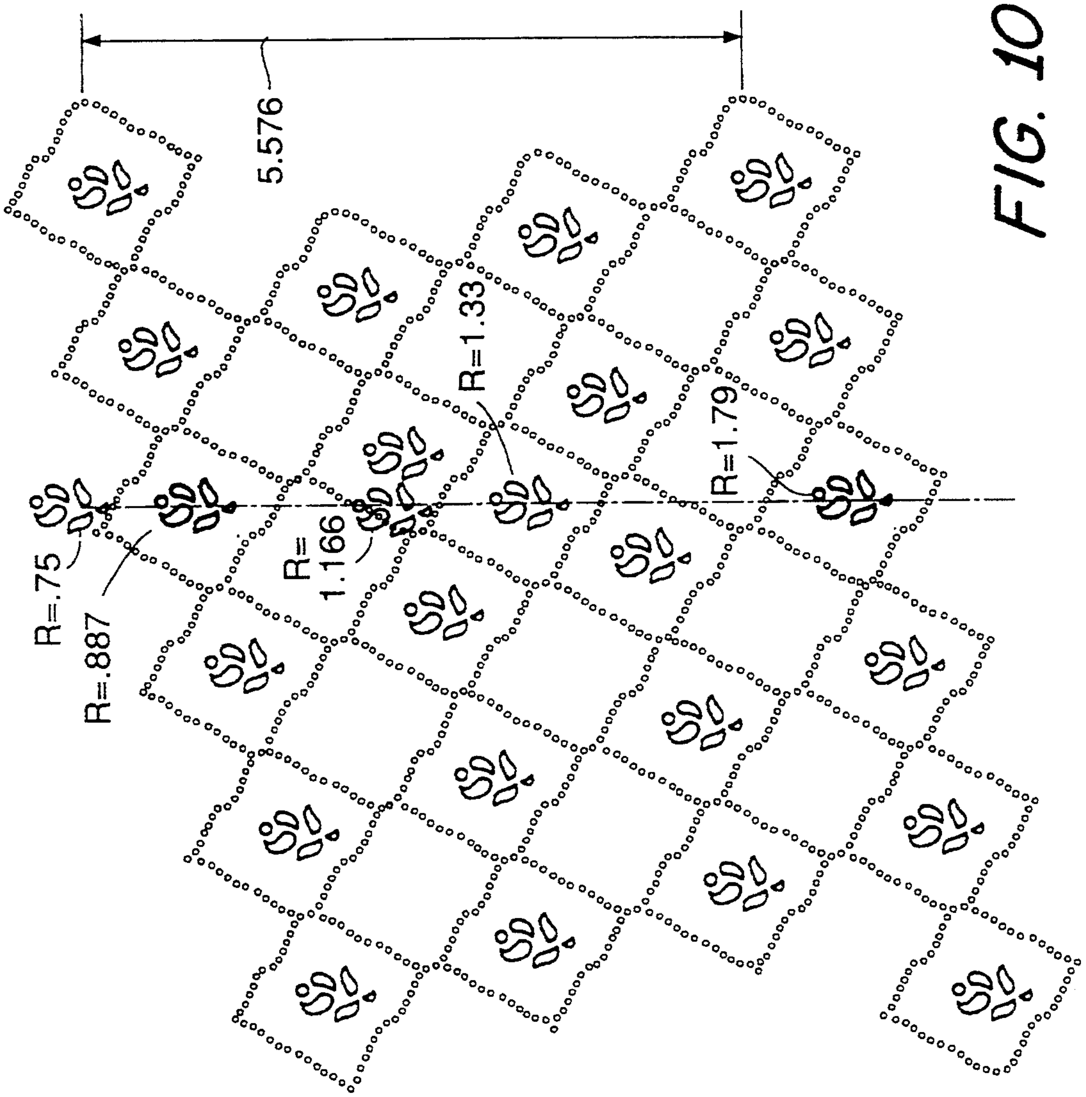
FIG. 10 illustrates the variation in the relative disposition of signature debossments on adjacent layers of tissue as a function of radial distance.

FIG. 10 illustrates the location of adjacent signature debossments on underlying and overlying sheets of the rolled product. The relative positions are indicated at roll radii of 0.75, 0.887, 1.166, 1.33 and 1.79 inches. FIG. 10 also illustrates that, when signatures on underlying and overlying sheets are passing those in the adjacent columns as the roll is filled, the signatures in adjacent columns just barely are superimposed at their very extremities, thus the roll builds uniformly.

Substantial nesting of the signature pattern occurs at a radius of 0.887 inch and 1.79 inches for a roll having a core of 1.5 inches and an outside diameter of 4.2 inches. Based upon core diameter and pattern diameter, calculation of regions of substantial overlap would be readily apparent to the skilled artisan.

Figure 11:
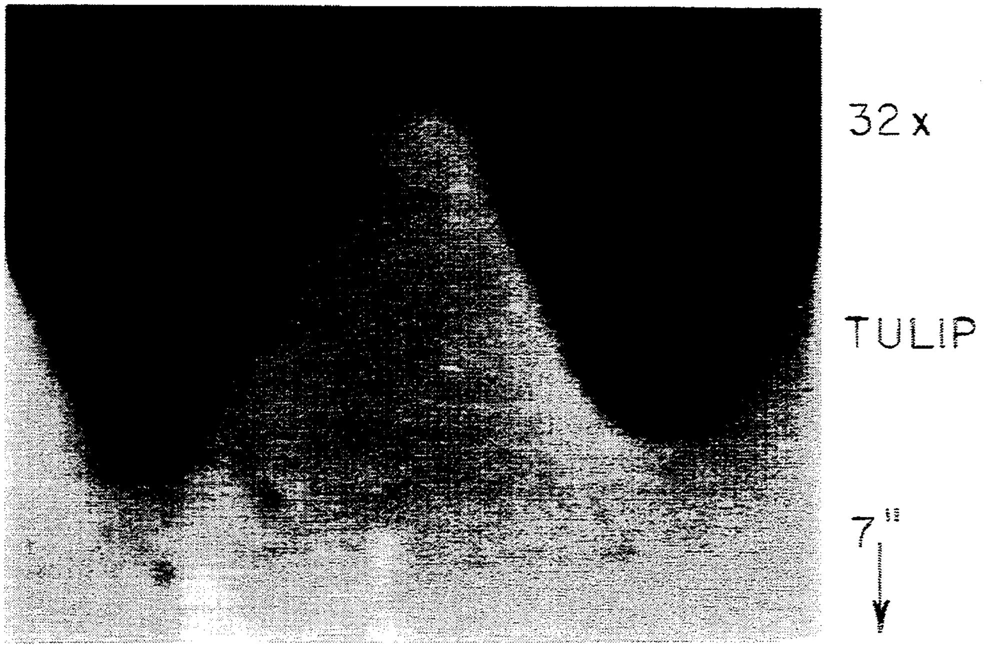
FIG. 11 is an optical photomicrograph illustrating a section through a portion of the sheet bearing a signature debossment of a tulip.

FIG. 11 is a photomicrograph of the cross-section of a signature debossment. As can be seen, the cross-section is substantially identical to that set forth in FIG. 4.

Figure 12:
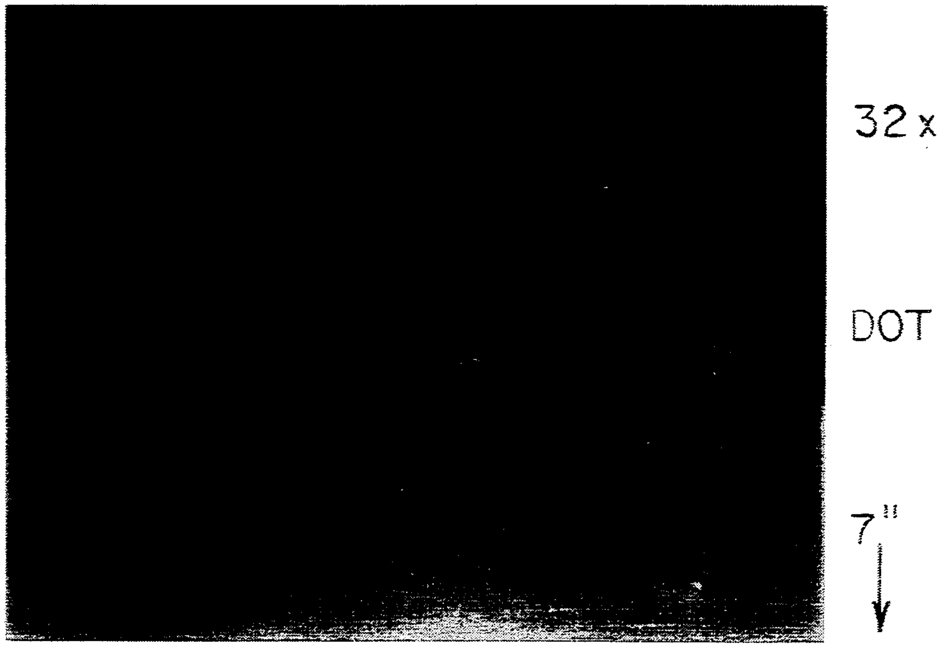
FIG. 12 is an optical photomicrograph illustrating a section through a portion of the sheet bearing a stitchlike deboss of a dot.

FIG. 12 is a photomicrograph of the cross-section of a stitchlike debossment. As can be seen, the cross-section is substantially identical to that set forth in FIG. 3.

Figure 13:
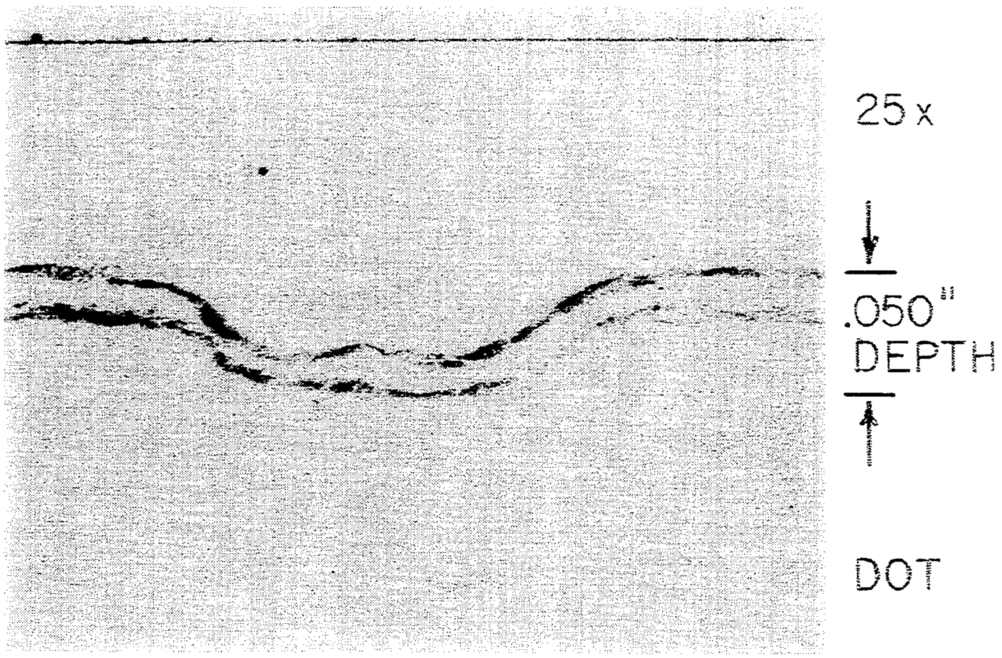
FIG. 13 is an optical photomicrograph illustrating a cross section of a finished sheet bearing a stitchlike debossment of a dot.
Figure 14:
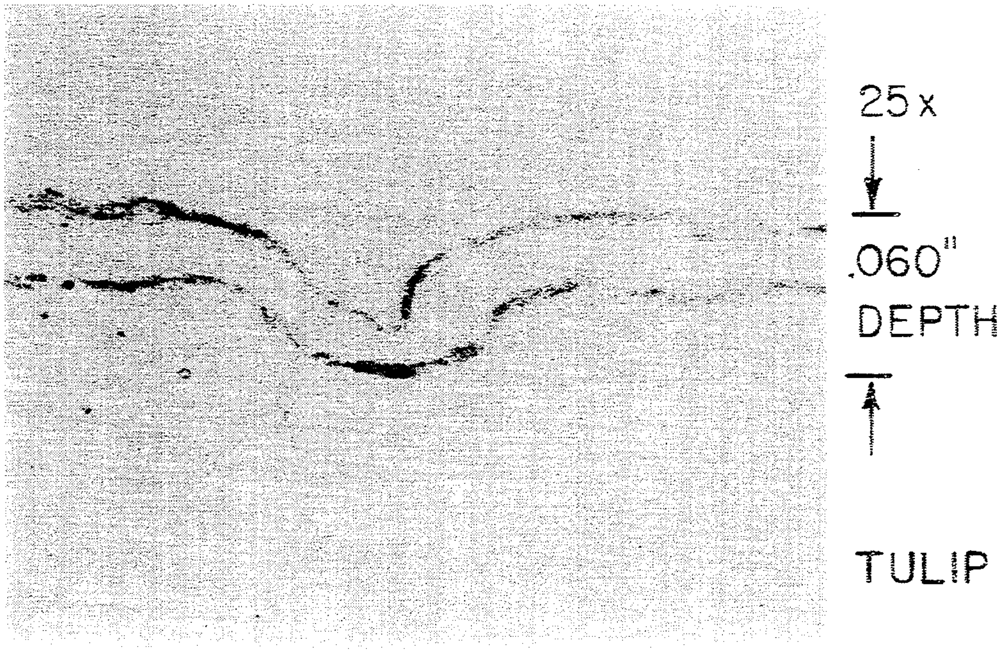
FIG. 14 is an optical photomicrograph illustrating a cross section of a finished sheet bearing a stitchlike debossment of a signature debossment of a flower.

FIGS. 13 and 14 illustrate the gentler slope and shallower embossing of the stitchlike debossment in FIG. 13 from the steeper slope and deeper embossing of the signature debossment of FIG. 14. This combination of two debossments improves the perception of softness.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A sheet of tissue having a plurality of debossments formed therein defining a lattice pattern having a plurality of polygonal cells, a fraction, more than one-third but less than two-thirds, of said polygonal cells being filled with a signature debossment, said lattice pattern having generators and being defined by a sinuous array of stitchlike debossments undulating about the generators of said lattice pattern, said stitchlike debossments being encompassed by rotund arcuate regions having cross-sectional radii of curvature exceeding at least about 0.015 inch; said signature being comprised of a plurality of elongated debossments having a depth of deboss exceeding the depth of deboss of said stitchlike debossments by at least 0.003 inch, said elongate debossments being encompassed by arcuate regions having cross-sectional radii of curvature of the arcuate regions encompassing said stitchlike debossments.

2. The sheet according to claim 1, the dispositions of said debossments being configured such that substantial nesting of said signature debossments on a roll occurs at a maximum of two locations.

3. The sheet according to claim 1, wherein the percent area of stitchlike debossments is no greater than 10%.

4. The sheet according to claim 1, wherein the percent area of signature debossments is no greater than 5%.

5. The sheet according to claim 1, wherein the total percent area of debossments is no greater than 20%.

6. The sheet according to claim 1, wherein said signature debossments are a plurality of closed segments.

7. The sheet according to claim 1, wherein the stitchlike debossment has a depth of about 0.050 inch.

8. The sheet according to claim 1, wherein the signature debossment has a depth of about 0.060 inches and an apex diameter of about 0.020 inches.

9. The sheet according to claim 1, wherein the cells created by the pattern of stitchlike debossment frame the signature debossment.

10. The sheet according to claim 1, wherein adjacent each side of each cell containing signature debossment are cells which do not contain signature debossment.

11. The sheet according to claim 1, wherein said signature is separated from said lattice pattern by at least 3 stitchlike boss diameters.

12. The sheet according to claim 1, wherein the stitchlike boss diameter is at least one and one half times the signature line width.

13. The sheet according to claim 12, wherein the stitchlike boss diameter is at least twice the signature line width.

14. The sheet according to claim 12, wherein tie stitchlike boss diameter is at least three times the signature line width.

15. The sheet according to claim 1, wherein said lattice has diamond shaped cells.

16. The sheet according to claim 1, wherein the width of said sheet is approximately 3 cells wide.

17. The sheet according to claim 15, wherein the length of the side walls of the cells is about 1.125 in.

18. The sheet according to claim 1, wherein the inclusion angles for the polygonal cells are about 77° and 103°.

19. The sheet according to claim 1, having a machine direction and a cross direction, wherein the signature debossments are aligned at angles of 53.6° counterclockwise, 15.0° counterclockwise, 24° clockwise and 75.5° clockwise from the machine direction of the sheet.

20. The sheet according to claim 1, wherein the center of the farthest stitchlike boss is at least 1 stitchlike boss diameter but no more than 3 stitchlike boss diameter from the line generating the polygonal cell.

21. The sheet according to claim 1, wherein said array of stitchlike debossments coincides with generators at least 2 times between apices.

22. The sheet according to claim 1, wherein the stitchlike debossments are circular dots.

23. The sheet according to claim 1, wherein the stitchlike debossments are dashes.

24. The sheet according to claim 23, wherein the dashes have an aspect ratio and said aspect ratio is less than 5.

25. The sheet according to claim 24, wherein said aspect ratio is between 3 and 5.

26. The sheet according to claim 1, wherein the lattice defines diamond shaped cells.

27. The sheet according to claim 1, wherein the lattice defines hexagonal cells.

28. The sheet according to claim 1, wherein the lattice defines octagonal cells.

29. A roll of embossed tissue having a plurality of debossments formed therein, said debossments comprising:

two series of intersecting sinuous lines of stitchlike debossments, one series of lines being disposed at a first acute angle clockwise of the machine direction of the roll, the other series of lines being disposed at a second acute angle counterclockwise of the machine direction of the roll whereby a repeating pattern comprising an oblique lattice of substantially uniform staggered wavy diamonds is defined;

a plurality of signature debosses centrally located within alternating rows of said diamond, the disposition of said debossments being configured such that substantial nesting of said signature embosses on said rolls occurs at a maximum of two locations on said roll, the outermost of said locations being spaced at least 1/32 inch below the exterior surface of said roll and, the innermost, at least 0.5 inch inward from said outermost substantial nesting location.

30. The roll of embossed tissue of claim 29, wherein, between said outermost nesting location and said innermost nesting location, signature debossments do not overlap each other over an area corresponding to at least 40% of the volume of said roll.

31. A roll of embossed tissue having a plurality of debossments formed therein, said debossments comprising:

two equally spaced series of intersecting sinuous lines of stitchlike debossments, one series of lines being disposed at a first acute angle clockwise of the machine direction of the roll, the other series of lines being disposed at a second acute angle counterclockwise of the machine direction of the roll whereby an oblique lattice of substantially uniform staggered wavy diamonds is defined;

a plurality of signature debosses centrally located within alternating rows of said diamond, the disposition of said debossments being configured such that, adjacent to the surface of said roll, signature debossments on closely adjacent overlapping repeats are displaced from each other by at least 0.50 inch.

32. The roll of embossed tissue of claim 31, wherein signature debossments do not overlap each other over a contiguous area corresponding to at least 40% of the volume of said roll.

33. The roll of embossed tissue of claim 31, wherein signature debossments do not overlap each other over a total area corresponding to at least 60% of the volume of said roll.

34. The roll of embossed tissue of claim 31, wherein the overall average percentage embossed areas are substantially equal in each machine direction strip of said roll.

35. A sheet of tissue having a plurality of debossments formed therein defining a lattice pattern having a plurality of polygonal cells, a fraction, less than all, of said polygonal cells being filled with a signature debossment, said lattice pattern having generators and being defined by a sinuous array of stitchlike debossments undulating about the generators of said lattice pattern, said stitchlike debossments being encompassed by upwardly flaring regions; said signature being comprised of a plurality of elongated debossments having a depth of deboss exceeding the depth of deboss of said stitchlike debossments, said elongate debossments being encompassed by upwardly flaring regions encompassing said stitchlike debossments being more steeply inclined than the upwardly flaring regions encompassing said stitchlike debossments.

* * * * *

UNITED STATES PATENT AND TRADEMARK OFFICE

CERTIFICATE OF CORRECTION

PATENT NO. : 5,436,057
DATED : July 25, 1995
INVENTOR(S) : Galyn A. SCHULZ

It is certified that error appears in the above-indentified patent and that said Letters Patent is hereby corrected as shown below:

Claim 1, column 9, line 25, after "curvature of" insert --not more than 50% of the average radius of curvature of--.

Signed and Sealed this

Twenty-ninth Day of October 1996

Attest:

BRUCE LEHMAN

*Attesting Officer* — *Commissioner of Patents and Trademarks*

UNITED STATES PATENT AND TRADEMARK OFFICE

CERTIFICATE OF CORRECTION

PATENT NO. : 5,436,057
DATED : July 25, 1995
INVENTOR(S) : Galyn A. Schulz

It is certified that error appears in the above-identified patent and that said Letters Patent is hereby corrected as shown below:

Title page,
Item [75], inventors: add -- Edward J. Giesler, Sr.

Signed and Sealed this

Eighteenth Day of September, 2001

*Attest:*

Nicholas P. Godici

*Attesting Officer*

NICHOLAS P. GODICI
*Acting Director of the United States Patent and Trademark Office*